United States Patent Office 3,075,966
Patented Jan. 29, 1963

3,075,966
5-HYDROXY - 5H - DIBENZ[c,e]AZEPINE, DERIVATIVES THEREOF AND METHOD FOR THEIR MANUFACTURE
John O. Hawthorne, Pittsburgh, and Edward L. Mihelic, Sr., Penn Hills Township, Allegheny County, Pa., assignors to United States Steel Corporation, a corporation of New Jersey
No Drawing. Filed June 8, 1960, Ser. No. 34,639
11 Claims. (Cl. 260—239)

This invention relates to an improved method of making azepines. These compounds have therapeutic and anti-oxidant properties which will be explained later. We have found that 2,2'-biphenyldicarboxaldehyde may be reacted with ammonia to form 5-hydroxy-5H-dibenz[c,e]-azepine, the reduction of which with hydrogen or sodium hydrosulfite gives 6,7-dihydro-5H-dibenz[c,e]azepin. Alternatively the aldehyde may be reacted with primary amines to form Schiff bases, the reduction of which with hydrogen or sodium hydrosulfite gives 6-substituted derivatives of 6,7-dihydro-5H-dibenz[c,e]azepine. In either case, the reduction with hydrogen is preferably effected by the aid of a suitable catalyst.

This is a continuation-in-part of our application Serial No. 797,330, filed March 5, 1959, now abandoned.

A method for the manufacture of 2,2'-biphenyldicarboxaldehyde by the ozonolysis of phenanthrene is described and claimed in the copending application of Robert H. Callighan et al. Serial No. 808,554, filed April 24, 1959, now abandoned in favor of a continuation-in-part thereof, Serial No. 75,086, filed December 12, 1960. By our invention we utilize the dialdehyde thus made available at low cost, in the production of other useful compounds. In addition to the azepines mentioned, derivatives such as the hydrochloride and methiodide may be readily obtained as well as other 6-substituted compounds, their acid salts, and their quaternary acid salts.

A complete understanding of the invention may be obtained from the following detailed explanation of a preferred practice and variations.

EXAMPLE I

In the first stage of our process, we refluxed 4 grams of 2,2'-biphenyldicarboxaldehyde with 60 ml. of 28% $NH_4OH$ for 15 minutes. On cooling, the white solid formed was collected, washed with water and dried. The product, 5-hydroxy-5H-dibenz[c,e]azepine, weighed 3.7 grams (97% yield) and melted in the range 126.8–128.8° C. The percentage composition determined experimentally compared with the calculated as follows:

|  | Experimental | Calculated ($C_{14}H_{11}NO$) |
| --- | --- | --- |
| Percent C | 80.59 | 80.36 |
| Percent H | 5.59 | 5.20 |
| Percent N | 7.00 | 6.70 |

The reaction may be represented thus:

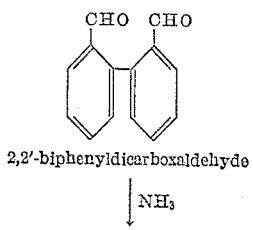

2,2'-biphenyldicarboxaldehyde

↓ $NH_3$ 5-hydroxy-5H-dibenz[c,e]azepine

The product resulting from the above process may be easily converted to the final product and an acid salt thereof by second-stage reactions. To this end, 5-hydroxy-5H-dibenz[c,e]azepine (3.0 grams) and sodium hydrosulfite (9 grams) were dissolved in water (100 ml.) and the solution refluxed for 30 minutes. On cooling, a colorless crystalline solid separated which was collected. More material was separated by adding sodium chloride ("salting out") to the filtrate. This solid was dissolved in water (200 ml.) containing 20 ml. of concentrated hydrochloric acid and refluxed for 30 minutes. The solution was cooled, filtered and concentrated at the boiling point to about 50 ml. volume. On cooling, large colorless crystals separated, were collected and dried in vacuo. Additional product was recovered upon further concentrating the mother liquor. The product, 6,7-dihydro-5H-dibenz[c,e]azepine hydrochloride, weighed 3.0 grams (92% yield) and melted in the range 290.2–291.2° C. compared to the accepted range 286–288° C.

From the above example, the following analytical results were obtained:

|  | Found | Calculated ($C_{14}H_{13}N.HCl$) |
| --- | --- | --- |
| Percent C | 71.55 | 72.50 |
| Percent H | 6.15 | 6.03 |
| Percent N | 6.20 | 6.08 |

The reduction reaction may be represented thus:

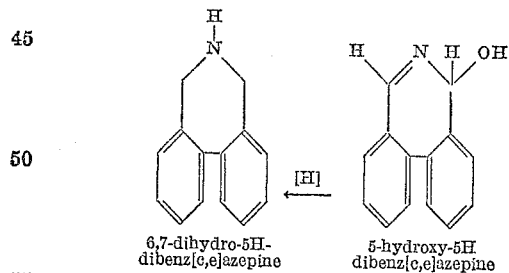

6,7-dihydro-5H-dibenz[c,e]azepine ← [H] 5-hydroxy-5H-dibenz[c,e]azepine

EXAMPLE II

We have also found that the amination of 2,2'-biphenyldicarboxaldehyde gives a Schiff-type base which may be reduced with sodium hydrosulfite to the 6-substituted azepine, 6-R-6,7-dihydro-5H-dibenz[c,e]azepine, where R may be a lower alkyl, allyl, phenyl, cyclohexyl or benzyl radical. As an example, 2,2'-biphenyldicarboxaldehyde (4.2 grams or 0.02 mole) was heated at 75 to 80° C. with water (20 ml.) and 30% aqueous methylamine (25 ml.) for one hour with stirring. The mixture was cooled and the colorless crystals collected, washed with water and dried. The product, 2,2'-bi(N-benzylidenemethylamine), melting in the range 144 to 146° C., weighed 4.66 grams (98% yield). Analysis of a sample recrystallized from n-heptane gave:

|  | Found | Calculated ($C_{16}H_{16}N_2$) |
|---|---|---|
| Percent C | 81.32 | 81.32 |
| Percent H | 6.82 | 6.84 |
| Percent N | 11.86 | 11.84 |

The benzylidenemethylamine is easily reduced to the azepine and converted into a salt thereof. For example, 4.6 grams of 2,2'-bi(N-benzylidenemethylamine) was dissolved in 100 ml. of 10% aqueous sodium hydrosulfite at room temperature. The solution was refluxed for one hour followed by concentration of the volume to about 30 ml. The solid material which separated on cooling was collected and dissolved in 50 ml. of 10% hydrochloric acid. The solution was neutralized with aqueous 7% sodium bicarbonate. The resultant oily phase was extracted into diethyl ether. After separation of the ether layer, the ether was evaporated from the free amine (6-methyl-6,7-dihydro-5H-dibenz[c,e]azepine), which weighed 3.75 grams (89% yield).

To the amine, dissolved in anhydrous diethyl ether (50 ml.), a solution of methyl iodide (7 ml.) in diethyl ether (25 ml.) was added drop-wise over a 15-minute period at room temperature. After an hour, the precipitated 6,6-dimethyl-6,7-dihydro-5H-dibenz[c,e]azepinium iodide was collected and dried. The iodide, 6.1 grams (87% yield from the dialdehyde), melted in the range 287 to 289° C., compared to the accepted melting point range, 287 to 288° C.

EXAMPLE III

As another example, 2,2-biphenyldicarboxaldehyde (4.2 grams or 0.02 mole) was heated at 85° C. with stirring in 30% aqueous monomethylamine (25 ml.) for 30 minutes. The solid was collected and transferred to a flask containing sodium hydrosulfite (12 grams) and water (75 ml.). The solution was refluxed for 30 minutes, allowing the volume to be concentrated to 20 ml. The aqueous phase was decanted after cooling and the residue washed with water. After drying, the residue was dissolved in n-heptane, and dry hydrogen chloride was passed into the solution. The precipitate was collected and dried. The product, 6-methyl-6,7-dihydro-5H-dibenz[c,e]azepine hydrochloride, weighed 4.0 grams (81% yield) and melted in the range 221.0 to 224.2° C.

EXAMPLE IV

Our invention also contemplates making Schiff's bases of the formula 2,2'-bi(N-benzylidene-R-amine) where R is one of the radicals mentioned above. For example, 2,2'-biphenyldicarboxaldehyde (2.1 grams) dissolved in toluene (30 ml.) was refluxed with benzylamine (2.20 ml.) for 15 minutes. The water from the reaction was collected in a Dean-Stark trap. The toluene was evaporated from the reaction solution, leaving an oil which solidified when mixed with water. The 2,2'-bi(N-benzylidenebenzylamine), weighing 3.86 grams (99% yield), melted in the range 94 to 97° C. The results of an analysis were as follows:

|  | Found | Calculated ($C_{28}H_{24}N_2$) |
|---|---|---|
| Percent C | 86.53 | 86.56 |
| Percent H | 6.25 | 6.23 |
| Percent N | 7.21 | 7.21 |

EXAMPLE V

The following is an example of the method of making from the above Schiff-type base a salt of the 6-substituted azepine, i.e., 6-benzyl-6,7-dihydro-5H-dibenz[c,e]azepine hydrochloride.

The oil, after removal of the toluene as explained above, was dissolved in methanol (5 ml.). A solution of sodium hydrosulfite (10 grams) in water (50 ml.) was added and the mixture was refluxed for 45 minutes. The methanol was evaporated and the aqueous phase decanted. The residue was boiled with 3% hydrochloric acid (100 ml.) and the solution filtered. The cooled solution was made basic (pH 12) with aqueous sodium hydroxide. The precipitated oil was extracted into diethyl ether and the ether dried. Anhydrous hydrogen chloride was passed into the solution until precipitation of the hydrochloride was complete. After collection and drying, the 6-benzyl-6,7-dihydro-5H-dibenz[c,e]azepine hydrochloride hemi-hydrate, weighing 2.99 grams (87% yield), melted in the range 203 to 205° C. The accepted melting point is 205° C.

EXAMPLE VI

The salt of another 6-substituted azepine, 6-allyl-6,7-dihydro-5H-dibenz[c,e,]azepine may be made as follows:

To a solution of 2,2'-biphenyldicarboxaldehyde (4.2 grams or 0.02 mole) in methanol (20 ml.) was added allylamine (3.1 ml. or 0.041 mole) and the solution was refluxed for 5 minutes. A solution of sodium hydrosulfite (15 grams) in water (75 ml.) was added to the cooled solution and the mixture refluxed for 30 minutes. The methanol was distilled from the solution, and the oil phase was extracted into diethyl ether from the cooled solution. The ether phase was dried over potassium hydroxide pellets, and crude 6-allyl-6,7-dihydro-5H-dibenz[c,e]azepine hydrochloride was precipitated from the ether by anhydrous hydrogen chloride, giving a weight of 4.88 grams (90% yield) melting in the range 190 to 200° C. This crude product was recrystallized from methanol-diethyl ether to give a 57% yield of product melting in the range 214 to 215° C. which is the generally accepted range.

EXAMPLE VII

A similar example for making 6-(2-aminoethyl)-6,7-dihydro-5H-dibenz[c,e]azepine dihydrochloride is: Ethylenediamine (2.0 ml.) was added to a solution of 2,2'-biphenyldicarboxaldehyde (4.2 grams) in methanol at room temperature. After 5 minutes, sodium hydrosulfite (10 grams) in water (50 ml.) was added and the mixture refluxed for an hour. The mixture was cooled to room temperature and the aqueous phase decanted. The residue, after being washed with water, was refluxed with 5% aqueous sodium hydroxide (20 ml.) and toluene (20 ml.) for a few minutes, dissolving the product in the toluene layer. The organic phase was separated, washed with water, and dried over potassium hydroxide. The crude 6-(2-aminoethyl)-6,7-dihydro-5H-dibenz[c,e]azepine dihydrochloride was precipitated with anhydrous hydrogen chloride. The yield was 4.6 grams (74%), melting in the range 255 to 260° C. Recrystallization from methanol gave 3.9 grams (63% yield) of product melting in the range 268 to 270° C., with the following composition:

|  | Found | Calculated ($C_{16}H_{18}N_2 \cdot 2HCl$) |
|---|---|---|
| Percent C | 61.42 | 61.73 |
| Percent H | 6.29 | 6.47 |
| Percent N | 9.38 | 9.00 |

The reduction of the 5-hydroxy-5H-dibenz[c,e]azepine or certain Schiff bases may also be effected by contact with free hydrogen. The general procedure is to dissolve 2,2'-biphenyldicarboxaldehyde (5.0 grams; 23.8 millimoles) in 95% ethanol (approximately 35 ml.). The appropriate amine (47 millimoles) is added followed by the correct amount of the catalyst being employed. Reaction conditions are given in Table I below for the individual reactions:

Table I

| R | Catalyst | Catalyst Concentration, Percent of Dialdehyde | Hydrogen Pressure at 25° C., p.s.i. | Reaction Temperature, ° C. | Reaction Time, hrs. | Yield, Percent | Melting Point of Product, ° C. | Dialdehyde Recovery, Percent | Test No. |
|---|---|---|---|---|---|---|---|---|---|
| Methyl | 5% Pd | 10 | 60 | 50 | 7 | 97 | 221–227 | 0 | 35-BM-1 |
| Benzyl | 5% Pd | 10 | 60 | 50 | 18 | 91 | 202–208 | 0 | 35-BL-26 |
| Phenyl | Raney Ni | 10 | 50 | 25 | 7 | 76 | 87–90 | 0 | 35-AP-26 |
| Hydrogen | ......do...... | 10 | 55 | 50 | 16 | 0 | ........ | 98 | 35-BL-20 |
| Do | ......do...... | 33 | 850 | 75 | 17 | 51 | 287–290 | 23 | 35-BL-21 |
| Do | 5% Pt | 10 | 800 | 85 | 24 | 84 | 284–290 | 0 | 35-BM-5 |
| Methyl | 5% Pt | 1 | 60 | 50 | 19 | 0 | ........ | 96 | 35-BK-50 |
| Allyl | 5% Pd [a] | 5 | 60 | 30 | 1 | 0 | ........ | 98 | 35-BL-36 |
| Do | 5% Pd | 10 | 60 | 50 | 1 | [b] 78 | 206–208 | 0 | 35-BL-31 |
| Cyclohexyl | 5% Pd | 4 | 850 | 85 | 7 | 2 | [c] 265–268 | 87 | 35-BL-30 |

[a] The reaction mixture also contained 0.02 gram of both zinc acetate dihydrate and ferrous chloride tetrahydrate.
[b] The product was 6-(n-propyl)-6,7-dihydro-5H-dibenz[c,e]azepine hydrobromide.
[c] Hydrobromide.

After hydrogen is vented, the catalyst is removed by filtration and the ethanol flash-evaporated. The residue is refluxed 5 to 10 minutes with 50 to 100 ml. of dilute hydrochloric acid (1 part concentrated acid, 9 parts water). Any unreduced Schiff base is hydrolyzed to the dialdehyde, which may be recovered by filtration on cooling. The azepines may be recovered as hydrochlorides by concentrating the filtrate.

The most active catalyst was palladium (5% on carbon powder), which gave high yields at low hydrogen pressure (50 to 60 p.s.i.). Raney nickel is active in hydrogenating 2,2'-bi(N-benzylideneaniline) at low pressure but not 5-hydroxy-5H-dibenz[c,e]azepine, from which unreacted dialdehyde was isolated in 98% recovery. However, under higher hydrogen pressure (850 p.s.i.), a 51% yield of 6,7-dihydro-5H-dibenz[c,e]azepine hydrochloride and a 23% recovery of the dialdehyde were obtained. Under similar conditions with platinum (5% on alumina) catalyst, the yield was 84% with no dialdehyde being recovered. The same platinum catalyst was unreactive at low pressures toward forming the 6-methyl derivative. The recovery of the dialdehyde was 96%.

All attempts to prepare the 6-allyl derivative using the palladium catalyst in the presence of zinc and iron (II) ions gave either no azepine or the 6-(n-propyl) derivative. If two molecular equivalents of hydrogen were reacted, the attack was on the allyl carbon-to-carbon double bond, and upon hydrolysis, a 98% recovery of the dialdehyde was obtained. If four molecular equivalents of hydrogen were consumed, 6-(n-propyl)-6,7-dihydro-5H-dibenz[c,e]azepine hydrobromide was isolated in 78% yield.

With the dialdehyde, cyclohexylamine, and the catalyst under hydrogen (800 p.s.i.), only a 2% yield of 6-cyclohexyl-6,7-dihydro-5H-dibenz[c,e]azepine hydrobromide was isolated along with an 87% recovery of the dialdehyde.

The following examples more clearly demonstrate the reduction using free hydrogen:

EXAMPLE VIII 2,2'-biphenyldicarboxaldehyde (2.1 grams or 0.01 mole), dissolved in toluene (30 ml.), was refluxed with aniline (2.04 grams or 0.021 mole) for 2 hours, with water being collected in a Dean-Stark trap. The toluene was evaporated and the residue dissolved in n-heptane (50 ml.), treated with activated charcoal, and cooled. The light-yellow crystals were collected and dried. The product, 2,2'-bi(N-benzylideneaniline), weighing 3.22 grams (89% yield), melted in the range 95.4 to 97.2° C. Further recrystallization from n-heptane gave crystals melting in the range 97.6 to 99.0° C. as compared to the accepted melting point range, 98 to 99° C.

2,2'-bi(N-benzylideneaniline) (2.26 grams) was dissolved in ethanol (50 ml.) and the solution hydrogenated over a Raney nickel catalyst at room temperature and 50 p.s.i. pressure for 7 hours. After removal of the catalyst by filtration, the ethanol was evaporated. The residue was recrystallized to give 1.3 grams (76%) yield of 6-phenyl-6,7-dihydro-5H-dibenz[c,e]azepine melting in the range 87 to 90° C.; recrystallized to a constant melting range of 89.5 to 91.6° C.

Analysis of the compound gave the following results:

|  | Found | Calculated ($C_{20}H_{17}N$) |
|---|---|---|
| Percent N | 5.38 | 5.17 |

EXAMPLE IX

A solution of 2,2'-biphenyldicarboxaldehyde (5.0 grams; 23.8 millimoles) and monoethylamine (7.1 ml. of a 30% aqueous solution) in 95% ethanol (30 ml.) with 5% palladium on carbon catalyst (0.5 gram) was shaken under hydrogen pressure (60 p.s.i. at 25° C.) for 7 hours at 50° C. The catalyst was removed by filtration and the ethanol was flash-evaporated. The residue was dissolved in n-heptane (approximately 100 ml.), and the heptane solution was washed with water and then dried over potassium hydroxide pellets. Excess hydrogen chloride was passed into the n-heptane to precipitate 5.7 grams (97% yield) of 6-methyl-6,7-dihydro-5H-dibenz[c,e]azepine hydrochloride.

EXAMPLE X

A solution of 2,2'-biphenyldicarboxaldehyde (5.0 grams; 23.8 millimoles) and benzylamine (5.11 grams; 47 millimoles) in 95% ethanol (37.5 ml.) was shaken with 5% palladium on carbon catalyst (0.5 gram) under hydrogen pressure (60 p.s.i. at 25° C.) for 18 hours at 50° C. The catalyst and solvent were removed and the oil was heated with dilute hydrochloric acid (50 ml.; 1 part concentrated acid, 9 parts water). Crystals formed and sufficient water was added to the boiling solution to dissolve them (approximate volume, 300 ml.). After cooling, 6.24 grams of crystals were collected. An additional 0.89 gram was collected by concentrating the mother liquor. The total yield of 6-benzyl-6,7-dihydro-5H-dibenz[c,e]azepine hydrochloride hemihydrate was 7.13 grams, or 91%, melting at 202 to 208° C.

EXAMPLE XI

A solution of 2,2'-biphenyldicarboxaldehyde (10.0 grams; 47 millimoles) and ammonium hydroxide (12 ml. of a 28% aqueous solution) in 95% ethanol (75 ml.) with Raney nickel (approximately 3 grams) was stirred under hydrogen (850 p.s.i. at 25° C.) in a 250-ml. autoclave at 75° C. for 17 hours. The catalyst and solvent were removed. The residue was dissolved in dilute hydrochloric acid (100 ml.; 1 part concentrated acid, 9 parts water) and the solution was refluxed for 30 minutes and cooled. The unreacted dialdehyde, which precipitated, solidified along with solid azepine hydrochloride. This solid was collected and washed with sufficient water to dissolve the hydrochloride from the dialdehyde. The dialdehyde, after drying, weighed 2.28 grams (22.8% recovery), melting point 60 to 62° C. The filtrate was concentrated at the boiling point until crystals began to form (approximate volume, 50 ml.). After the filtrate was cooled, the crystals of 6,7-dihydro-5H-dibenz [c,e]-azepine hydrochloride, 5.66 grams (51% yield), were collected therefrom. The product melted at 287 to 290° C.

EXAMPLE XII

A solution of 2,2'-biphenyldicarboxaldehyde (5.0 grams; 23.8 millimoles) and ammonium hydroxide (6 ml. of a 28% aqueous solution) in 95% ethanol (30 ml.) with 5% platinum or alumina catalyst (0.5 gram) was stirred under hydrogen (800 p.s.i. at 25° C.) in a 250-ml. autoclave at 85° C. for 24 hours. The solvent and catalyst were removed, and the residue was refluxed for 10 minutes with dilute hydrochloric acid (100 ml.; 1 part concentrated acid, 9 parts water). Only a trace of dialdehyde separated and was removed by filtration. The filtrate was concentrated at the boiling point to approximately 20 ml. and cooled. The product, 6,7-dihydro-5H-dibenz[c,e]azepine hydrochloride, was collected. The yield was 4.7 grams (84%) melting at 284 to 290° C.

The anti-oxidant property of the azepines on linseed oil is shown by the following tests: Samples (4.0000 grams) of (1) boiled linseed oil and (2) boiled linseed oil containing one weight percent of the compound being tested were weighed into petri dishes 90 mm. in diameter. The change in weight as a function of time at room temperature, a measure of the absorption of oxygen, was determined. At the end of 71 hours, the following data were obtained:

| | Weight gain or weight loss, mg./4.0000 gram sample |
|---|---|
| Boiled linseed oil | +213 |
| Boiled linseed oil +1% 6,7-dihydro-5H-dibenz[c,e]azepine | −10 |
| Boiled linseed oil +1% 6-methyl-6,7-dihydro-5H-dibenz[c,e]azepine | +17 |

The 6,7-dihydro-5H-dibenz[c,e]azepine and its derivatives are useful as an agent for inhibiting or reversing the physiological effect of epinephrine. The phosphate salt of the 6-allyl derivative is sold under the trademark "Ilidar."

It will be apparent that our invention provides a simple and convenient method of making azepines, specifically 6,7-dihydro-5H-dibenz[c,e]azepine, and its 6-substituted derivatives, and their acid and quaternary salts by reductive amination of a dialdehyde, 2,2'-biphenyldicarboxaldehyde. The groups other than hydrogen on the nitrogen atom of the parent compound may be a monovalent hydrocarbon radical such as alkyl (e.g., methyl), alkenyl (e.g., allyl), aryl (e.g., phenyl), cycloalkyl (e.g., cyclohexyl), and aralkyl (e.g., benzyl) radicals; or substituted radicals (e.g., 2-aminoethyl). These amines form salts with organic and inorganic acids (e.g., acetic and hydrochloric acids) and form quaternary salts with quaternizing reagents (e.g., methyl iodide).

Although we have disclosed herein the preferred embodiment of our invention, we intend to cover as well any change or modification therein which may be made without departing from the spirit and scope of the invention.

We claim:

1. The process defined in claim 4, characterized by effecting the reduction by contact with free hydrogen under superatmospheric pressure, in the presence of a catalyst selected from the group consisting of platinum, palladium and nickel.

2. A method of making 6-n-propyl-6,7-dihydro-5H-dibenz[c,e]azepine which comprises subjecting 2,2'-bi(N-benzylideneallylamine) to contact with free hydrogen in the presence of a palladium catalyst.

3. A Schiff base having the formula:

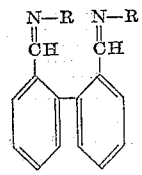

where R is a monovalent hydrocarbon radical selected from the group consisting of methyl, 2-aminoethyl, benzyl, allyl and cyclohexyl.

4. The process which comprises reacting 2,2'-biphenyldicarboxaldehyde with a compound selected from the group consisting of ammonia, methylamine, aniline, benzylamine and allylamine, and subsequently bringing the reaction product into contact with hydrogen and collecting the corresponding 6,7-dihydro-5H-dibenz[c,e]azepine thus formed.

5. A method of making 6,7-dihydro-5H-dibenz[c,e]-axepine which consists in bringing 5-hydroxy-5H-dibenz[c,e]azepine into contact with hydrogen, and collecting the azepine thus formed.

6. The method of making 6-R-6,7-dihydro-5H-dibenz[c,e]azepines which comprises bringing the corresponding 2,2'-bi(N-benzylidene-R-amine) into contact with hydrogen, R being a radical selected from the group consisting of lower alkyl, 2-aminoethyl, benzyl, allyl and cyclohexyl, and collecting the azepine thus formed.

7. The compound 5-hydroxy-5H-dibenz[c,e]azepine.

8. The process which comprises reacting 2,2-diphenyl dicarboxaldehyde with a compound selected from the group consisting of ammonia, methylamine, aniline, benzylamine and allylamine and subsequently reducing the reaction product therefrom to the corresponding 6,7-dihydro-5H-dibenz[c,e]azepine.

9. A method of making 6-substituted 6,7-dihydro-5H-dibenz[c,e]azepine which consists in reacting 2,2'-biphenyldicarboxaldehyde with a reagent selected from the group consisting of ammonia, methylamine, aniline, benzylamine, allylamine and ethylenediamine, treating the reaction product with sodium hydrosulfite and collecting the azepine formed thereby.

10. A method of making 6,7-dihydro-5H-dibenz[c,e]-azepine which consists in refluxing 5-hydroxy-5H-dibenz[c,e]azepine with aqueous sodium hydrosulfite.

11. The method of producing 6-R-6,7-dihydro-5H-dibenz[c,e]azepines which comprises treating with sodium hydrosulfite the corresponding 2,2'-bi(N-benzylidene-R-amine), R being a radical selected from the group consisting of methyl, 2-aminoethyl, benzyl, allyl and cyclohexyl.

No references cited.

UNITED STATES PATENT OFFICE
CERTIFICATE OF CORRECTION

Patent No. 3,075,966

January 29, 1963

John O. Hawthorne et al.

It is hereby certified that error appears in the above numbered patent requiring correction and that the said Letters Patent should read as corrected below.

Column 1, line 17, for "azepin" read -- azepine --; column 2, in the table, third column, heading for "Calculated $(C_{14}H_{13}N \cdot HCl)$" read -- Calculated $(C_{14}H_{13}N \cdot HCl)$ --; column 4, in the table, third column, heading for "Calculated $(C_{16}H_{18}N_2 \cdot 2HCl)$" read -- Calculated $(C_{16}H_{18}N_2 \cdot 2HCl)$ --; column 5, in the footnote "b" of Table 1, for "axepine" read -- azepine --; column 8, line 1, for "1." read -- 4.--; line 6, for "2." read -- 1. --; line 10, for "3." read -- 2. --; line 23, for "4." read -- 3. --; same column 8, line 31, for "axepine" read -- azepine --.

Signed and sealed this 10th day of September 1963.

(SEAL)
Attest:

ERNEST W. SWIDER
Attesting Officer

DAVID L. LADD
Commissioner of Patents